Feb. 16, 1937.    F. E. MECHLING    2,070,995
WHEEL BALANCING DEVICE
Filed June 28, 1935

Inventor
Frederick E. Mechling

By Jesse R. Crossan
Attorney

Patented Feb. 16, 1937

2,070,995

UNITED STATES PATENT OFFICE 2,070,995

WHEEL BALANCING DEVICE

Frederic E. Mechling, Akron, Ohio, assignor of one-half to George A. Wiedemer, Wadsworth, Ohio Application June 28, 1935, Serial No. 28,832

6 Claims. (Cl. 301—5)

This invention relates to the art of balancing rotary bodies, and it refers particularly to means for balancing assemblies of vehicle wheels and pneumatic tires to insure that they will run substantially true.

With modern increased driving speeds of automobiles and the like and changes in tire design, the balanced condition of the wheel assemblies has assumed greater importance than in the past. In the first place, the present day tires of large cross-sectional diameter, for operation under relatively low pressure, are more difficult to construct in true balance than was the case with high pressure tires. Secondly, the higher driving speeds produce greater centrifugal forces which, in an unbalanced assembly, develop unfavorable conditions known as tramp, toe-in, shimmy, and the like, resulting in too rapid and uneven wear of the tire. Various expedients have been proposed to eliminate this difficulty, but all of them prior to this invention have given rise to objections.

Most tire manufacturers now have their tires individually tested to determine the location of the heavy and light sides and the amount or degree of unbalance, and the tires are marked accordingly. Some follow the practice of placing patches inside the tires or on appropriate parts of the inner tubes to bring about the desired equilibrium. Others fasten one or more small weights to the wheels by means of set screws or other mechanical fastening devices. While the latter are effective, they are difficult to set or place exactly, and in some cases such weights contact with and chafe and unduly bend portions of the tire side walls.

The foregoing and other objectionable features of the prior art are overcome by the present invention which has among its objects the provision of novel tire-balancing means which can be quickly and easily applied and adjusted.

Another object of the invention is to provide such balancing means which will be held in place without extraneous fastening devices.

A further object is to provide such balancing means which will not have any injurious action upon the tire and will not interfere with the flexibility thereof.

Still another object is to provide such means which will be simple in construction, neat in appearance, strong and durable in service, and economical in production. These and other objects, features, and advantages of the invention will become apparent from the following description in connection with the accompanying drawing wherein the invention has been shown merely by way of illustration, and wherein Figure 1 is a perspective view of one of the novel balancing devices embodying the invention;

Figure 1:
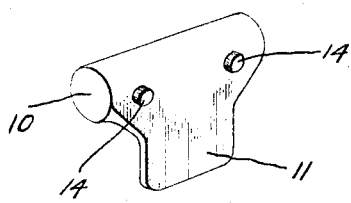
Figure 2:
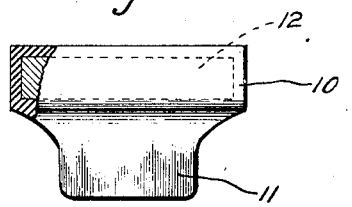
Figure 2 is a front or outer side view of the same.
Figure 3:
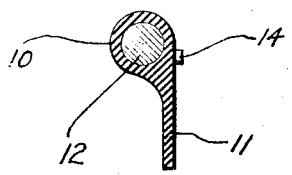
Figure 3 is a cross sectional view taken at the central portion of Figure 2.

Referring first to Figures 1, 2 and 3, it will be seen that the novel balancing device comprises a body portion 10 having a laterally extending flexable lip 11. This body portion 10 may be of any appropriate size and shape but preferably it is cylindrical and of a length somewhat greater than its diameter. Although other materials may be employed if desired, the body 10 is advantageously composed of rubber or similar resilient stock and is weighted by an embedded metallic insert 12. With such a construction, the lip 11 may be integral with the body 10 and substantially tangent to one side thereof. From this it will be evident that the lip, being formed of rubber, is freely flexible and elastic, properties which are important in this invention. On the rear or inner surface of the device and in the zone of merger between the lip and the body, there are formed two slight projections 14 suitably spaced apart and adapted to contact with the tire when in use.

Figure 4:
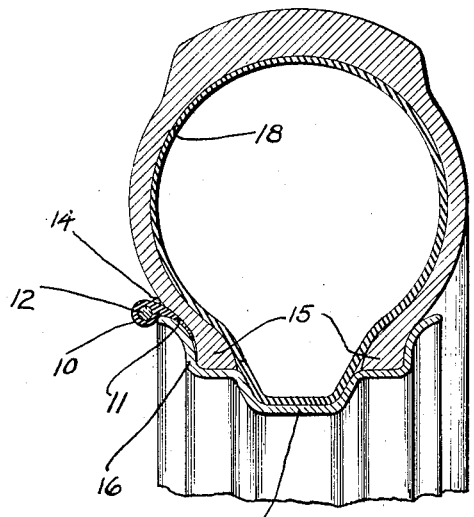
Figure 4 is a fragmentary transverse sectional view through a wheel assembly and showing one of the novel balancing devices in place.

As clearly shown in Fig. 4, the novel balancing device may be mounted for use without any extraneous fastening means. The lip 11 is merely inserted between the side of the tire bead 15 and the flange 16 on the rim 17, and the weighted body 10 is left projecting over the edge of the flange 16. The projections 14 bear against the adjacent portion of the tire in such a manner as to maintain the body portion 10 spaced slightly therefrom, this reducing to a minimum any tendency toward chafing the tire. The device may easily be shifted circumferentially with reference to the rim whereby to locate it exactly in the desired position, and it will be clamped tightly and frictionally held in place by reason of the pressure of the inflated inner tube 18. Although only one of the devices may suffice for a wheel assembly, preferably two are used at spaced intervals about the rim and in definite relation to the heavy side of the wheel assembly so as to effect perfect balance.

Figure 5:
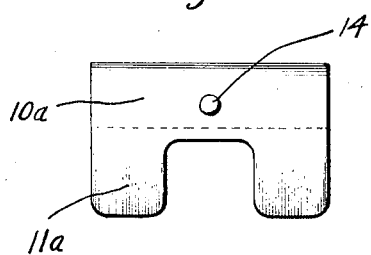
Figure 5 is a rear or inner side view of a modified form of the invention.

In the device already described, the lip 11 is of a width less than the length of the body 10 but in this respect the details may be modified. Thus in Figure 5 the body 10a is provided with what may be termed a double lip 11a which functions in the same way as lip 11. Furthermore, in this embodiment there is shown only one projection 14 and obviously one, two or more may be used regardless of the shape of the lip.

From the foregoing it will be evident that the novel balancing device is extremely simple in construction and neat in appearance. As the wheel assembly rotates under load, the side walls of the tire flex and in such action the weighted body portion 10 is easily moved correspondingly, while the lip 11 alternately stretches slightly and returns to its original position. It is this flexibility and elasticity that protects the tire from excessive local strains and this is important. Obviously, the devices may be produced in a series of different weights from which any particular one may be selected for any particular tire.

While the normal clamping pressure is ordinarily sufficient to maintain the balancing devices in place, they may, if desired, be cemented either to the tire or to the rim flange. At any rate, the mode of attachment is very simple and conducive to economical manufacture. It will be understood that various minor changes may be made other than those already illustrated and referred to, and the right is herein reserved to make such changes as fall within the scope of the appended claims without departing from the spirit of the invention.

Having thus described the invention, what is claimed is:

1. A counter-balancing weight for a tire and wheel assembly comprising a substantially cylindrical rubber body weighted with a metallic core, and a relatively thin integral elastic lip extending tangentially from one side of said body and adapted to provide means for clamping between the tire and part of the wheel, and a pair of relatively small resilient projections adapted to reduce to a minimum any chafing action between said body and the tire.

2. A counter-balancing weight for pneumatic tired vehicle wheels comprising a heavy body portion, and a pliable securing tongue portion projecting from the body portion adapted to be frictionally clamped between the tire rim flange and tire bead by the inflation pressure of the tire, said pliable tongue portion being adapted to support the body portion outward of the rim flange adjacent the lower side wall of the tire.

3. A counter-balancing weight for pneumatic tired vehicle wheels, said weight being adapted to be removably secured at the point of meeting of the lower side wall of the tire and the periphery of the tire rim flange, and comprising a thickened body portion of a configuration capable of seating with its underside facing the periphery of the rim flange and with its rear side opposing the tire wall above the rim flange, and a relatively thin pliable securing tongue portion extending substantially tangentially to the rear side of the body portion and adapted to be clamped between the tire bead and rim flange through the inflation pressure of the tire to support the body portion outward of the rim flange.

4. A counter-balancing weight for pneumatic tired vehicle wheels comprising a tongue portion adapted to be frictionally clamped between the tire rim flange and tire bead, and a heavy body portion hingedly supported by the tongue portion and adapted when in use to move with flexing of the tire relative to the rim flange.

5. In combination with a vehicle wheel having a pneumatic tire and flanged tire rim, a counter-balancing weight comprising a heavy body portion supported beyond the tire rim flange adjacent the lower side wall of the tire, and a deformable securing tongue for said body portion frictionally secured between the tire bead and rim flange, said deformable tongue being adapted to bend with the flexing of the tire wall to permit movement of the body portion relative to the rim flange.

6. A counter-balancing weight for pneumatic tired vehicle wheels comprising a weighted rubber body portion adapted to seat above the rim flange adjacent the lower side wall of the tire, and a deformable rubber supporting tongue portion for said body portion adapted to be frictionally held between the tire bead and rim flange through the inflation pressure of the tire.

FREDERIC E. MECHLING.